United States Patent
Hamilton et al.

(10) Patent No.: US 6,247,734 B1
(45) Date of Patent: Jun. 19, 2001

(54) AUTOMOBILE BODY PROTECTION APPARATUS

(76) Inventors: Leonard O'Shannon Hamilton; Elizabeth Ann Burden, both of 306 Payne St., Georgetown, KY (US) 45324; La Blanche Juliette Hamilton Trail, 4198 Feiner Dr., Cleveland, OH (US) 44122; Gwendolyn Nadine Hamilton Tucker, 1248 Val Vista, Pomona, CA (US) 91768; William Hayes Hamilton, 9799 Wayne Ave., Cincinnati, OH (US) 45215

( * ) Notice: Subject to any disclaimer, the term of this patent is extended or adjusted under 35 U.S.C. 154(b) by 0 days.

(21) Appl. No.: 09/558,767

(22) Filed: Apr. 26, 2000

(51) Int. Cl.[7] .................................................. B60R 13/04
(52) U.S. Cl. ............................................................ 293/128
(58) Field of Search ..................... 293/122, 128, 293/144, 107; 296/189, 146.6; 280/770

(56) References Cited

U.S. PATENT DOCUMENTS

| | | | |
|---|---|---|---|
| 3,738,695 | * | 6/1973 | McBee .................................. 293/128 |
| 4,401,331 | * | 8/1983 | Ziner et al. ........................... 293/128 |
| 4,708,380 | * | 11/1987 | Cruz ..................................... 293/128 |
| 4,726,614 | * | 2/1988 | Myers et al. ......................... 293/128 |
| 4,828,302 | * | 5/1989 | Marasigan, Jr. ..................... 293/128 |
| 4,828,303 | * | 5/1989 | Soria .................................... 293/128 |
| 5,149,166 | * | 9/1992 | Wille et al. .......................... 293/128 |
| 5,156,425 | * | 10/1992 | Wagner ................................ 293/128 |
| 5,162,139 | * | 11/1992 | Gomez et al. .................. 293/128 X |
| 5,184,857 | * | 2/1993 | Hawkins .............................. 293/128 |
| 5,680,886 | * | 10/1997 | Ohtsuka ......................... 296/189 X |
| 5,956,918 | * | 9/1999 | Wise ................................ 293/128 X |
| 5,975,599 | * | 11/1999 | Goldstein ............................. 293/128 |

* cited by examiner

Primary Examiner—Joseph D. Pape
(74) Attorney, Agent, or Firm—Mark F. Smith; Smith, Guttag & Bolin

(57) ABSTRACT

The present invention is directed to an apparatus for protecting the external body of an automobile from minor dents, scratches, and the like caused by the impingement of objects such as doors from adjacent vehicles, shopping carts, and the like. In a preferred embodiment of the invention, the automobile body protection apparatus comprises flexible convoluted tubing and means for removably attaching and for positioning the flexible convoluted tubing along the external surface of the automobile. In a preferred embodiment of the invention the automobile body protection apparatus includes means for locking the device to the automobile.

20 Claims, 10 Drawing Sheets

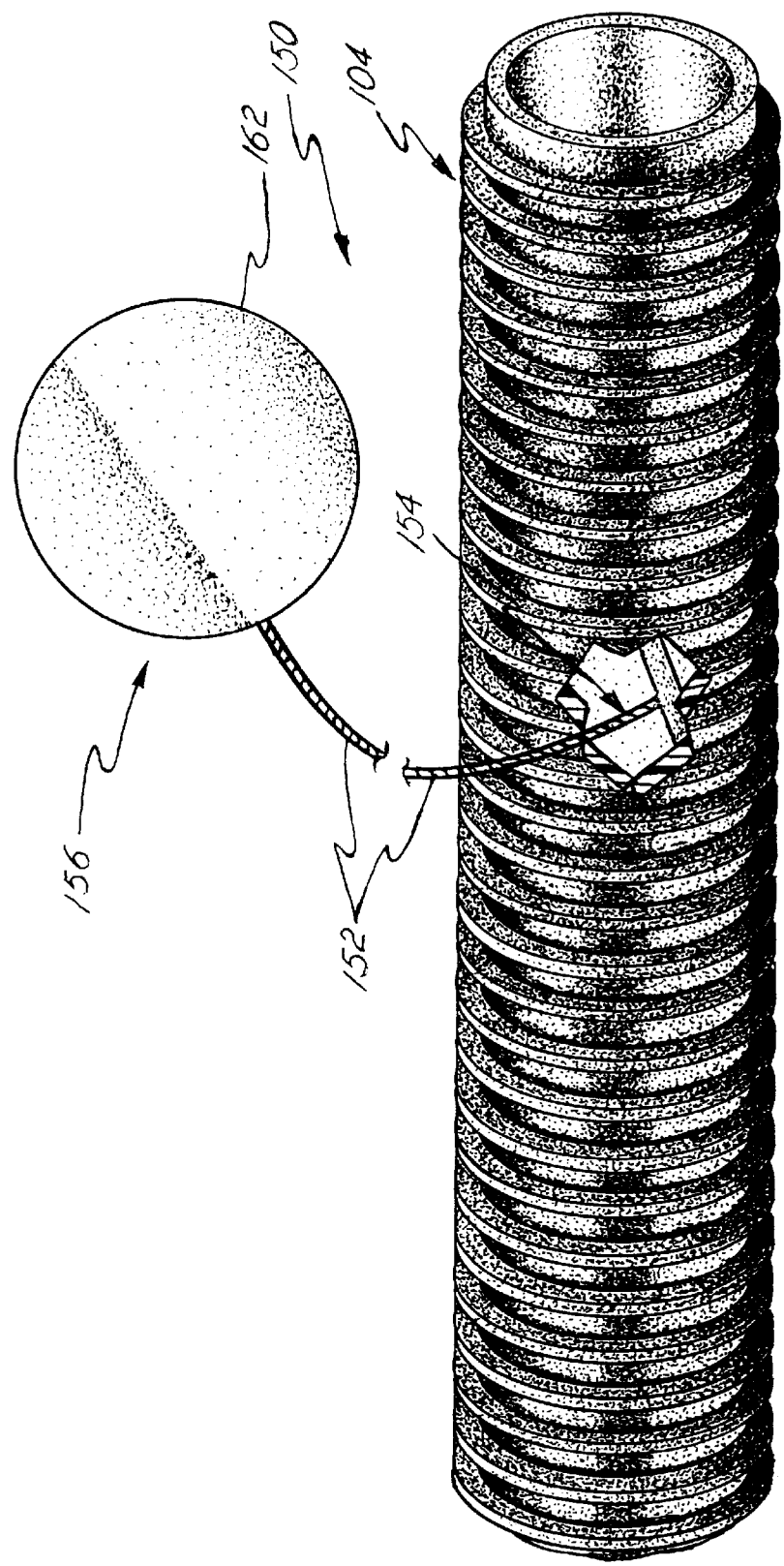

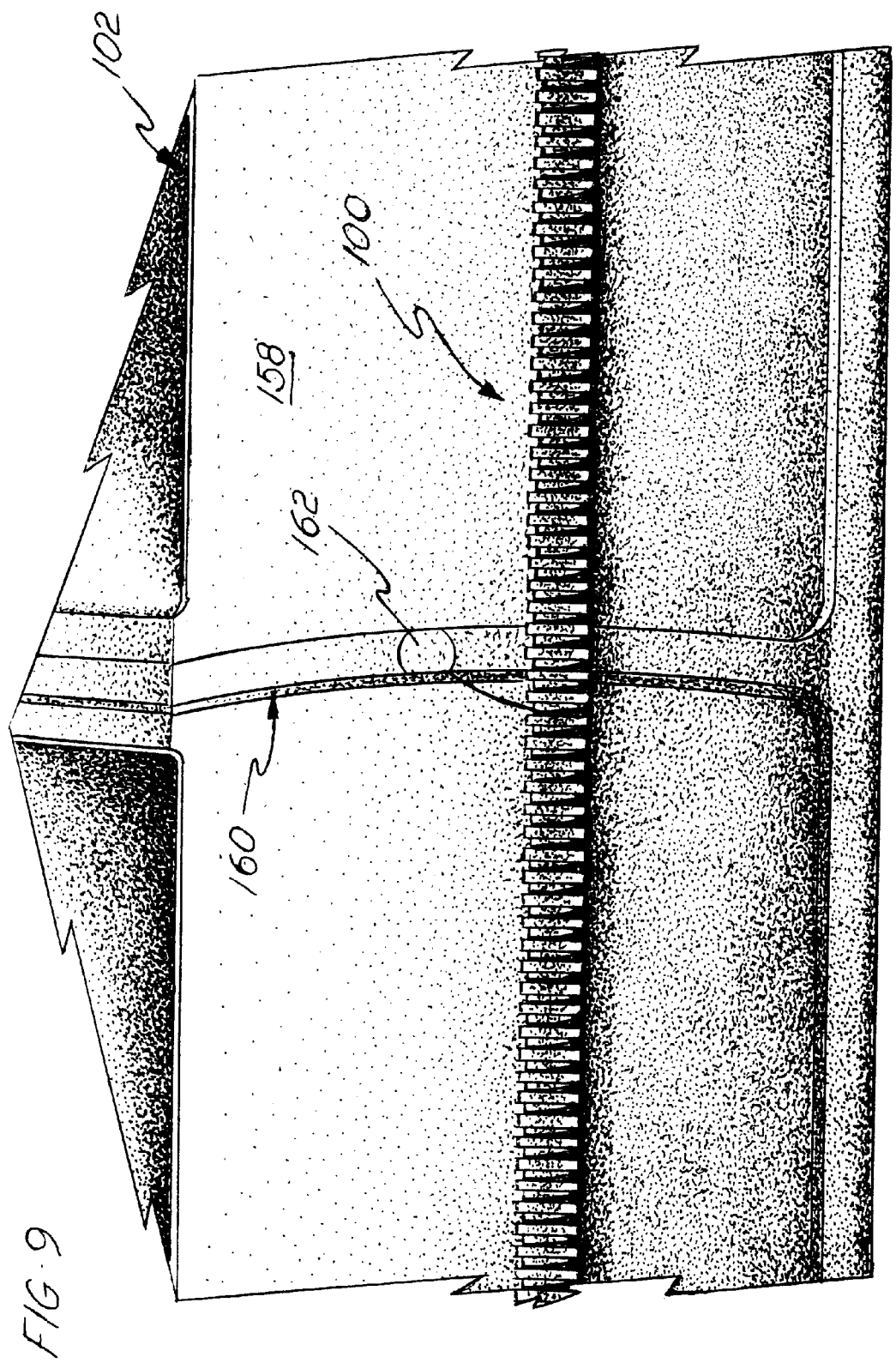

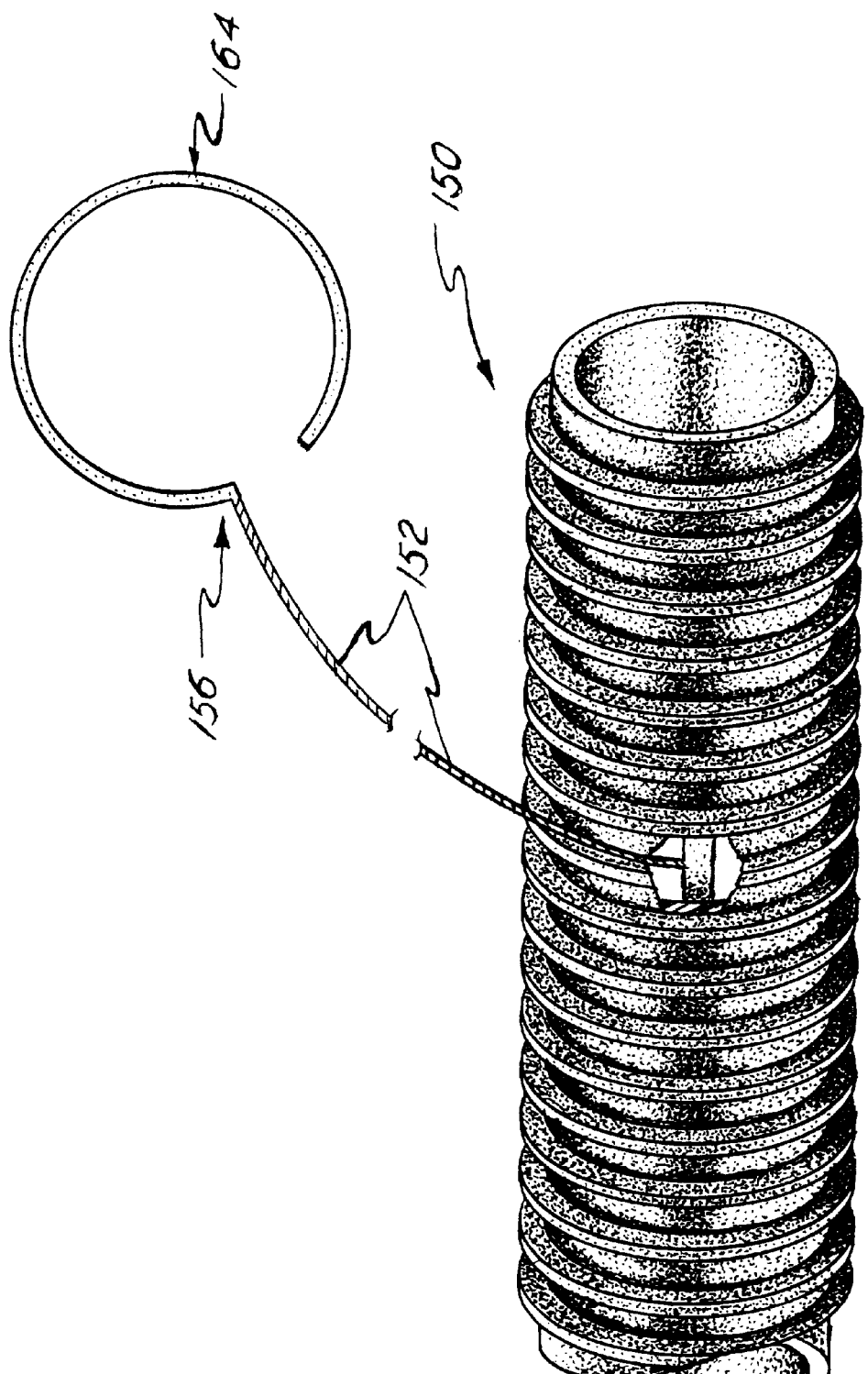

AUTOMOBILE BODY PROTECTION APPARATUS

BACKGROUND OF THE INVENTION

The present invention is directed to an apparatus for protecting the external body of an automobile and more specifically, to a new and novel automobile body protection apparatus for protecting the external body of an automobile from minor dents, scratches, and the like caused by the impingement of objects such as doors from adjacent vehicles, shopping carts, and the like.

Automobiles, are often subject to being damaged when they are parked in close proximity to each other. Such damage typically takes the form of scratches, dents, chipped paint, abrasions, and related damage to the surface finish of the automobile's external body. Such damage frequently occurs when the door of an adjacent automobile is carelessly opened with sufficient force and comes in contact with an adjacent automobile. Such contact often results in the edge of the opened door chipping or otherwise marring the surface finish or even causing a dent in the body of the struck automobile. In addition, automobiles are also frequently parked in areas near shopping centers where metal shopping carts are used. Such carts are often carelessly pushed into contact with a parked automobile or are discarded in the parking areas where they may roll into contact with an automobile. Such contact with the metal shopping cart may also cause damage to the surface finish of the struck automobile. The cost to repair the surface finish of an automobile caused by such impacts can be costly and inconvenient and may diminish its value.

In order to reduce or eliminate such damage, manufactures have equipped automobiles with permanent molding strips that extend along the sides of an automobile in an effort to block doors, shopping carts, or the like from contacting the body of the automobile. Unfortunately, such strips are often of an inadequate width or thickness, or are positioned at a height for appearance purposes and may thereby limit the strips functionality.

Various devices have also been developed for attaching to and providing protection to an automobile. Many of the devices are however, relatively expensive to manufacture, difficult to install, or are not of adequate thickness to resist heavy impacts. Many such devices also do not easily adjust to the various surface configurations or body styling of automobiles. Further, during periods of rain, many such devices accumulate water across their top surface causing the device to sag out of position thereby reducing their effectiveness in providing protection to the automobile body.

Accordingly, a need exist for a new and novel automobile body protection apparatus, that can be easily installed along the body of an automobile, is relatively inexpensive to manufacture, is of adequate thickness to resist heavy impacts, easily adjusts to a variety of body configurations or styling, prevents or reduces the accumulation of water that can cause a device to sag out of position, and can be easily stored during periods of nonuse.

SUMMARY OF THE INVENTION

The present invention is directed to an apparatus for protecting the external body of an automobile from minor dents, scratches, and the like caused by the impingement of objects such as doors from adjacent vehicles, shopping carts, and the like. In a preferred embodiment of the invention, the automobile body protection apparatus comprises flexible convoluted tubing and means for attaching and for positioning the flexible convoluted tubing along the external surface of the automobile.

In another preferred embodiment of the present invention, the flexible convoluted tubing is formed of an elastomeric material tubing comprising a cylindrical wall with axially spaced annular circumferential continuous convolutions integral therewith.

In another preferred embodiment of the present invention, the flexible convoluted tubing is formed from at least two tubing sections for increasing the length of the apparatus for protecting the external body of an automobile.

In another preferred embodiment of the present invention, the apparatus for protecting the external body of an automobile includes an outer sheath.

In another preferred embodiment of the present invention, the apparatus for protecting the external body of an automobile includes means for attaching the apparatus to the wheel wells of the automobile.

In another preferred embodiment of the present invention the apparatus for protecting the external body of an automobile includes means for attaching the apparatus to the wheel wells of the automobile which is adjustable for reducing the sag of the tubing.

In another preferred embodiment of the present invention, the apparatus for protecting the external body of an automobile includes means for removably attaching the apparatus to the external surface of the automobile.

In another preferred embodiment of the present invention, the apparatus for protecting the external body of an automobile includes suction means for removably attaching the apparatus to the external surface of the automobile.

In another preferred embodiment of the present invention, the apparatus for protecting the external body of an automobile includes means for preventing theft of the apparatus.

A primary object of the present invention, therefore, is to provide an automobile body protection apparatus for protecting the external body of an automobile from minor dents, scratches, and the like caused by the impingement of objects.

Another primary object of the present invention is to provide an automobile body protection apparatus that can be easily mounted along the external surface of the body of the automobile.

Another primary object of the present invention is to provide an automobile body protection apparatus that can be easily increased in length.

Another primary object of the present invention is to provide an automobile body protection apparatus that is relatively flexible.

Another preferred embodiment of the present invention is to provide an automobile body protection apparatus that can easily accommodate to various body configurations and body styles.

Another primary object of the present invention is to provide an automobile body protection apparatus that can resist heavy impacts.

Another primary object of the present invention is to provide an automobile body protection apparatus that includes an anti-theft means.

Another primary object of the present invention is to provide an automobile body protection apparatus that is relatively inexpensive to manufacture.

Another primary object of the present invention is to provide an automobile body protection apparatus that is relatively durable and lightweight in construction.

Another primary object of the present invention is to provide an automobile body protection apparatus which prevents the accumulation of rain water across the top of the apparatus reducing the tendency of the apparatus to sag.

These and other objects and advantages of the invention will be apparent from the following description, the accompanying drawings and the appended claims.

BRIEF DESCRIPTION OF THE DRAWINGS

FIG. 8 is a schematic view of a portion of the auto body protection apparatus of the present invention showing an anti-theft device having a first end attached to the convoluted tubing and a second end for inserting between the door and the door post of an automobile;

FIG. 9 is a schematic view of a portion of the auto body protection apparatus of FIG. 8 showing the anti-theft device having a second end inserted between the door and the door post of an automobile; and FIG. 10 is a schematic view of another embodiment of the anti-theft device of FIG. 8 showing the second end having means for attaching to the door catch of an automobile.

DETAILED DESCRIPTION OF THE PREFERRED EMBODIMENTS

Figure 1:
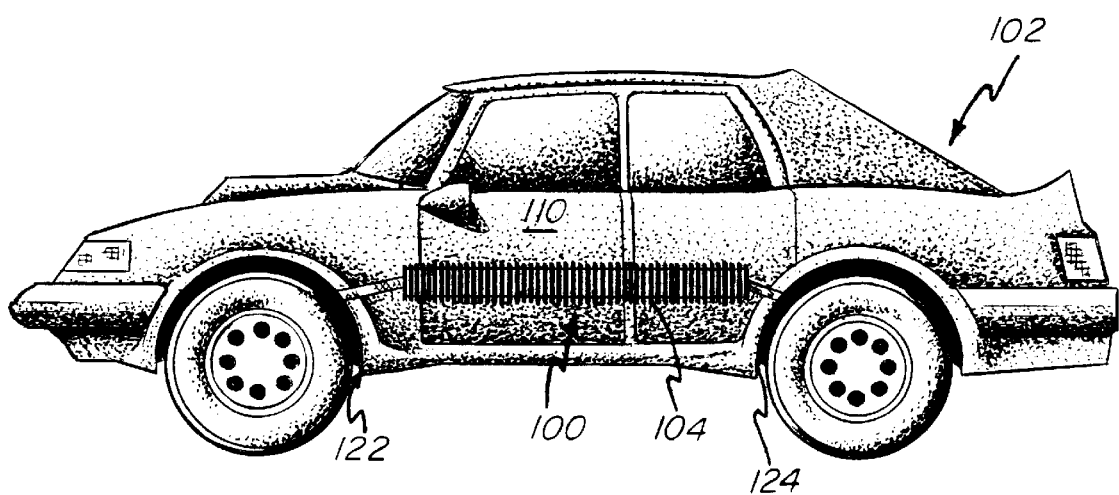
FIG. 1 is a side elevation view showing an automobile having the automobile body protection apparatus of the present invention mounted thereon.
Figure 2:
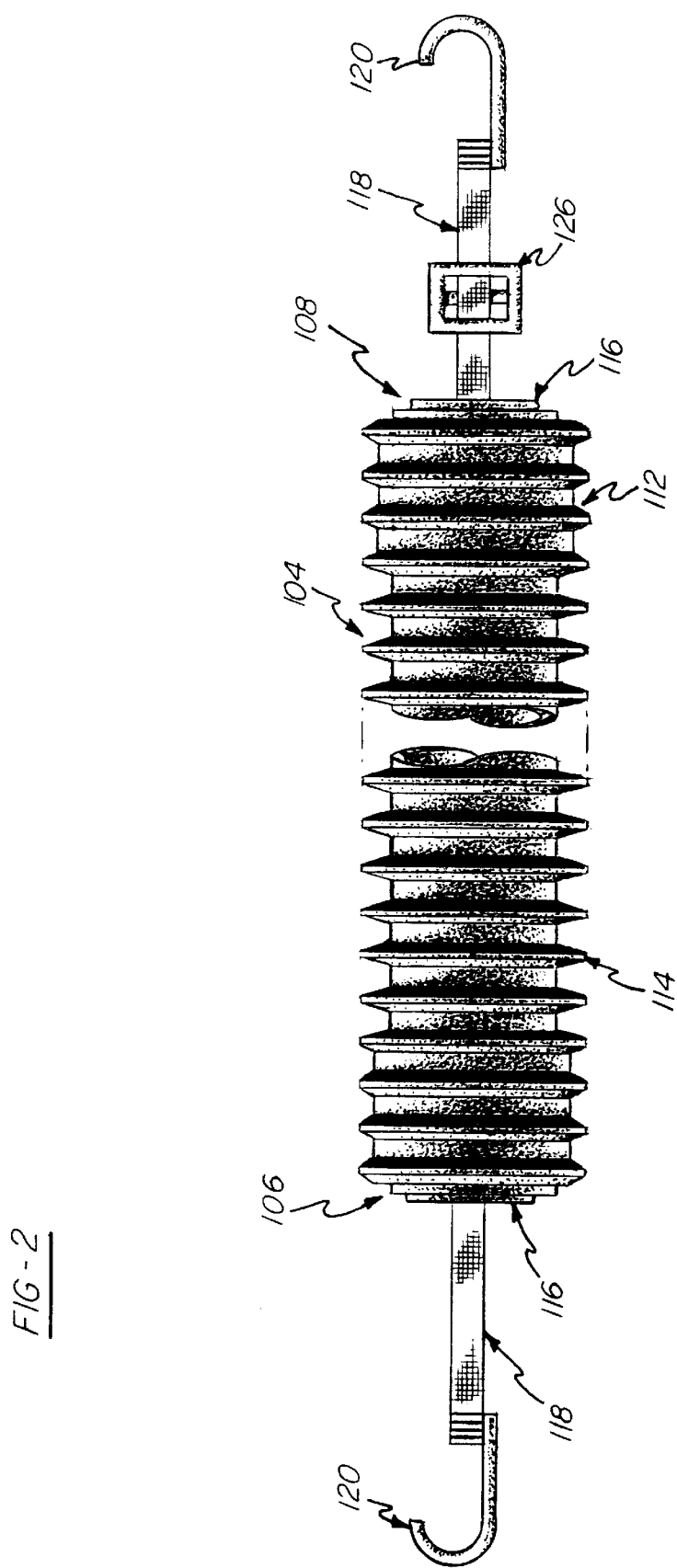
FIG. 2 is an elevation view of a length of the automobile body protection apparatus of the present invention showing means for attaching the apparatus to the wheel wells of an automobile.

Referring to FIG. 1, a preferred embodiment of an automobile body protection apparatus for protecting the external body of an automobile, generally designated 100, is shown in its operative position longitudinally disposed along the side of an automobile 102. As used herein, the term "automobile" includes automobiles, trucks, vans, boats, recreational vehicles and other similar vehicles. Referring to FIGS. 1 and 2, the apparatus 100 comprises flexible convoluted tubing 104 having separate ridges and grooves extending transversely of the longitudinal axis of the tubing 104, and first and second ends 106 and 108, respectively, each having means for attaching the apparatus 100 to the automobile 102 such that the flexible convoluted tubing 104 extends along the external surface 110 of the automobile 102. It should now be apparent to those skilled in the art that the convoluted tubing 104 can be selected having various diameters, it has been found that a convoluted tubing having an external diameter of about 0.75 inches (1.91 cm) to about 4 inches (10.16 cm), and more preferably about 1.5 inches (3.8 cm,), provides sufficient impact resistance while maintaining an pleasing appearance.

Preferably, the flexible convoluted tubing 104 is formed from a resilient elastomeric material, such as aliphatic and aromatic polyketones, fluorine based thermoplastics, polyvinyl chlorides, poly amides, or any other suitable material conventionally used for forming convoluted tubing. The convoluted tubing 104 includes a cylindrical wall 112 with axially spaced annular circumferential continuous convolutions 114 integral therewith and preferably formed throughout the length of the tubing 104 using processes well-known in the art and cut into desired lengths to easily accommodate various sizes of automobiles. The axially spaced annular circumferential continuous convolutions 114 provides the apparatus 100 with sufficient resiliency and flexibility for adapting its use for a variety of automobile body styles and configurations as well as providing the apparatus 100 with the capability of being rolled or coiled for periods of storage. In addition, the use of convoluted tubing provides drainage that prevents rain water from accumulating on the top of the apparatus 100 and between the exterior surface 110 of the automobile 102 and the cylindrical wall 112 of the tubing 104 which can cause sagging or displacement of the apparatus 100 thereby reducing its effectiveness.

As shown in FIGS. 1 and 2, the first and second ends 106 and 108, respectively, are each provided with an end cap 116. In a preferred embodiment of the invention, the end caps 116 are each provided with a flexible elastic strap 118 having a hook 120. The straps 118 should be capable of expanding sufficiently to permit each hook 120 to reach and removably attach to either the front or the rear wheel well 122 and 124, respectively, of the automobile 102 in such a manner that the flexible convoluted tubing 104 extends longitudinally along the external surface 110 of the automobile 102. It should now be apparent to those skilled in the art that the straps 118 should be able to provide sufficient tension to maintain the tubing 104 in a relatively taut condition when the apparatus 100 is mounted to the automobile 102. It should also now be apparent that one or both of the straps 118 can be provided with a buckle 126 to permit the user to adjust the length of the strap 118 to accommodate slight variations in the size and body styling of automobiles.

In operation, the automobile body protection apparatus 100 may be stored in a rolled-up or coiled stored condition until needed. To use, after the operator of the automobile 102 is parked, the operator unrolls the apparatus 100 and attaches one hook 120 to the corresponding wheel well 122, 124 of the automobile 102 and the other hook 120 to its corresponding wheel well 122, 124 of the automobile 102 such that the flexible convoluted tubing 104 extends longitudinally along the external surface 110 of the automobile 102 between the wheel wells 122 and 124. By adjusting the straps 118, using buckle 126, the tubing 104 can be placed in a taut condition thereby eliminating most of the sag and properly positioning the tubing 104 along the side of the automobile 102. To remove the apparatus 100, the operator simply disconnects the hooks 120 from the wheel wells 122 and 124 and rolls or coils the apparatus 100 back into its stored condition.

Figure 3:
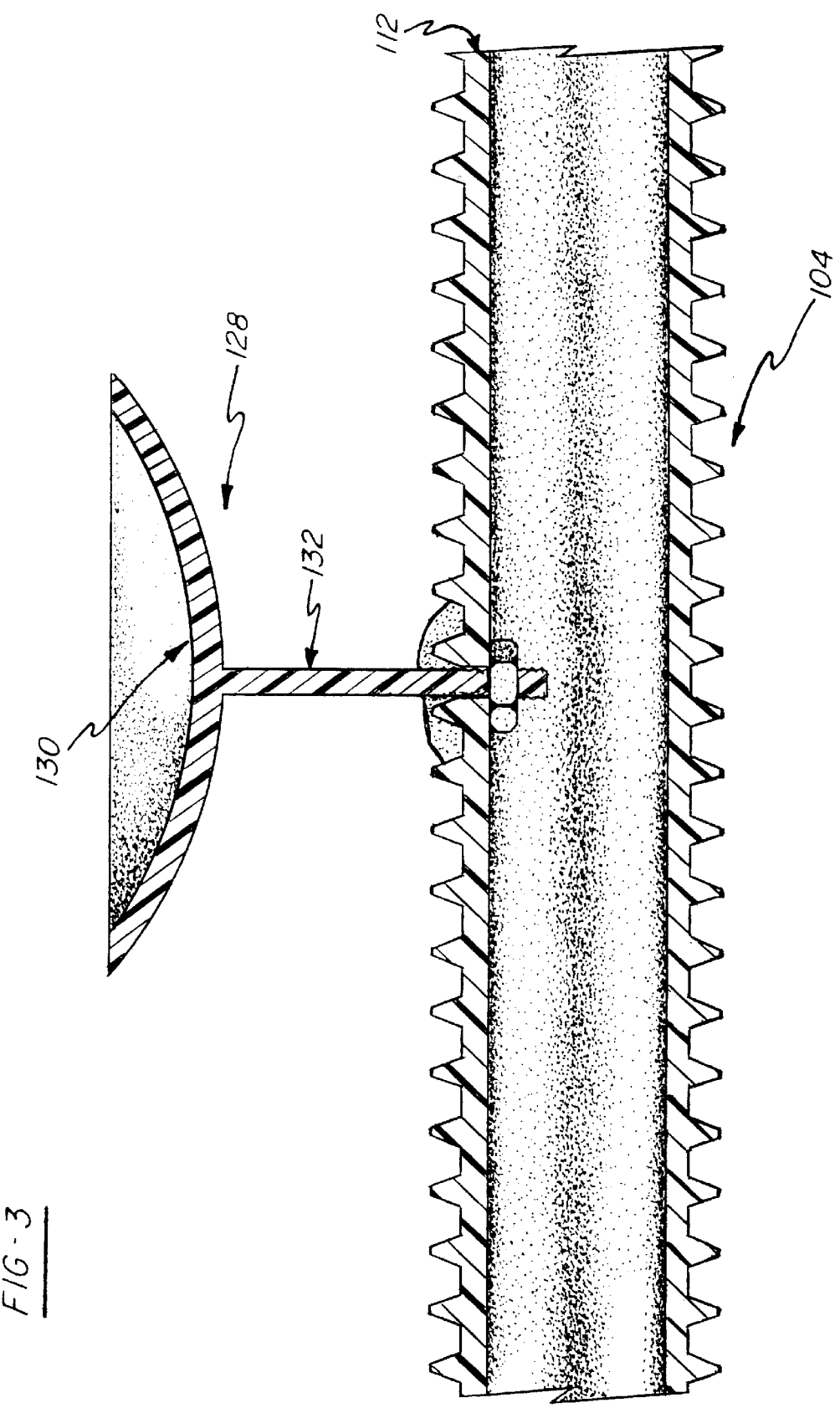
FIG. 3 is an top view of the automobile body protection apparatus of the present invention showing another preferred means for attaching the apparatus to an automobile.

Referring to FIG. 3, another preferred embodiment of the apparatus for protecting the external surface 110 of an automobile 100 (FIG. 1) is shown whereby the flexible convoluted tubing 104 is provided with a plurality of spaced apart suction devices 128, such as suction cups, that are rigidly secured thereto. While only one suction device 128 is shown for illustration purposes, one skilled in the art should now find it apparent that a plurality of suction devices may be placed longitudinally along the convoluted tubing 104 to securely attach the tubing 104 to the external surface 110 of the automobile 102. Each suction device 128 has a resilient concave portion 130 and a stem 132 protruding from the center of and in the opposite direction of the concave portion 130. Various methods can be used for attaching the suction device 128 to the cylindrical wall 112 of the convoluted tubing 104. For example, the suction devices 128 may be rigidly secured along the cylindrical wall 112, such as by glue (as shown), detents, pins, snaps, or any other conventional manner. In operation, the automobile body protection apparatus 100 can be readily mounted longitudinally along body of the automobile 102 (FIG. 1) by merely pressing the suction devices 128 onto the external surface 110 of the automobile 102. It should now be apparent to those skilled in the art that the use of convoluted tubing 104, as used herein, permits a light weight yet durable design that allows the apparatus 100 to be supported by the suction devices 128.

Figure 4:
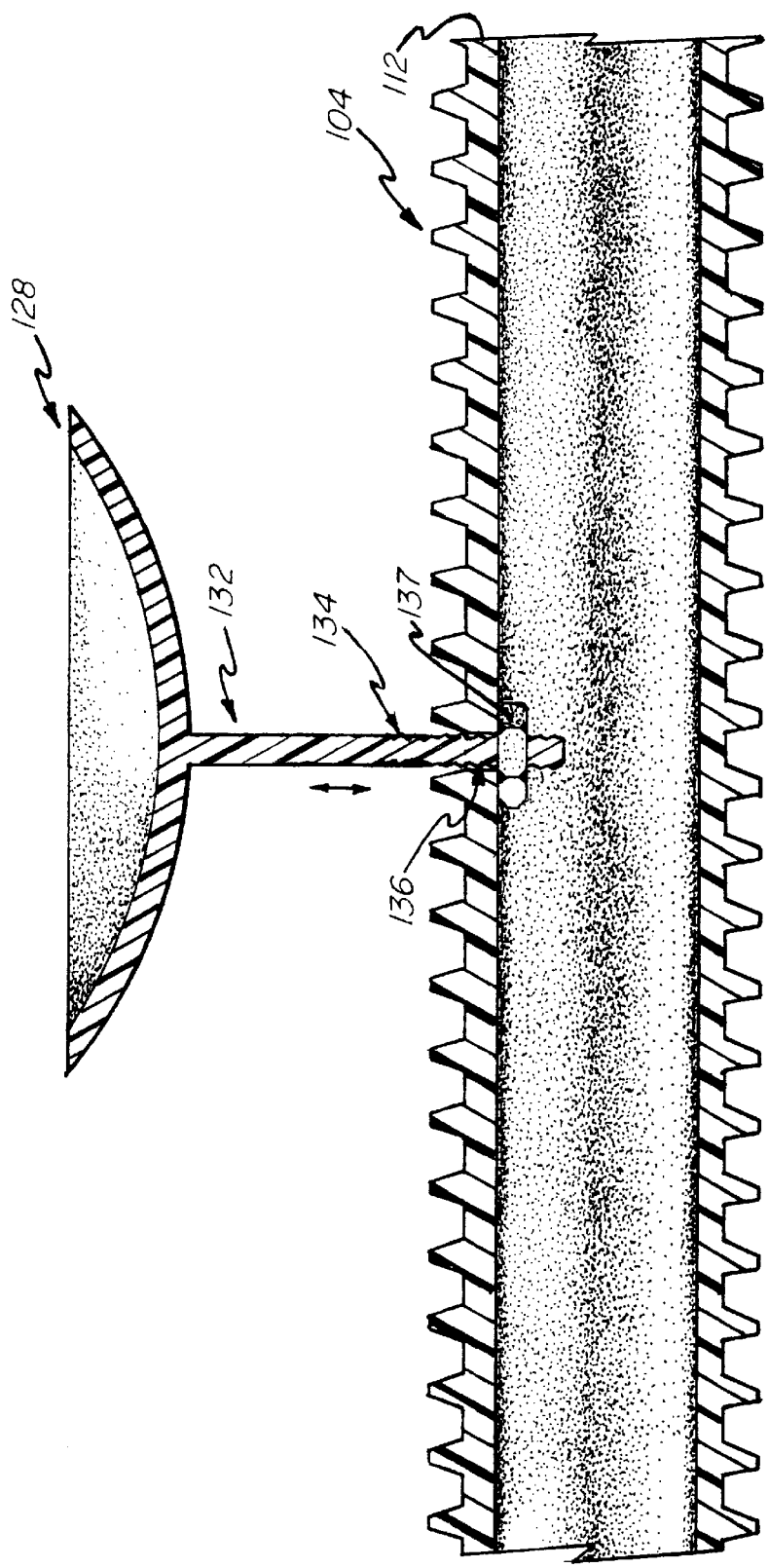
FIG. 4 is a elevation view of the preferred means for attaching the apparatus to an automobile of FIG. 3 showing means for laterally adjusting the position of the tubing.

In another preferred embodiment of the invention, as shown in FIG. 4, the stem 132 of each suction device 128 comprises a threaded shaft 134 which protrudes through a corresponding aperture 136 in the cylindrical wall 112 of the tubing 104. A lucking nut 137 is provided to receive the threaded shaft 134 to attach the suction device 128 to the convoluted tubing 104. The amount of cup extension, for moving the tubing 104 laterally in a direction to or away from the external surface 110, from the cylindrical wall 112 can then be varied by screwing the threaded shaft 134 in a direction into or out of the locking nut. Such outward or inward adjustment of the suction device 128 together with the flexibility of the convoluted tubing 104 allows the apparatus 100 to easily adapt and conform to the contours of various styles of automobiles.

Figure 5:
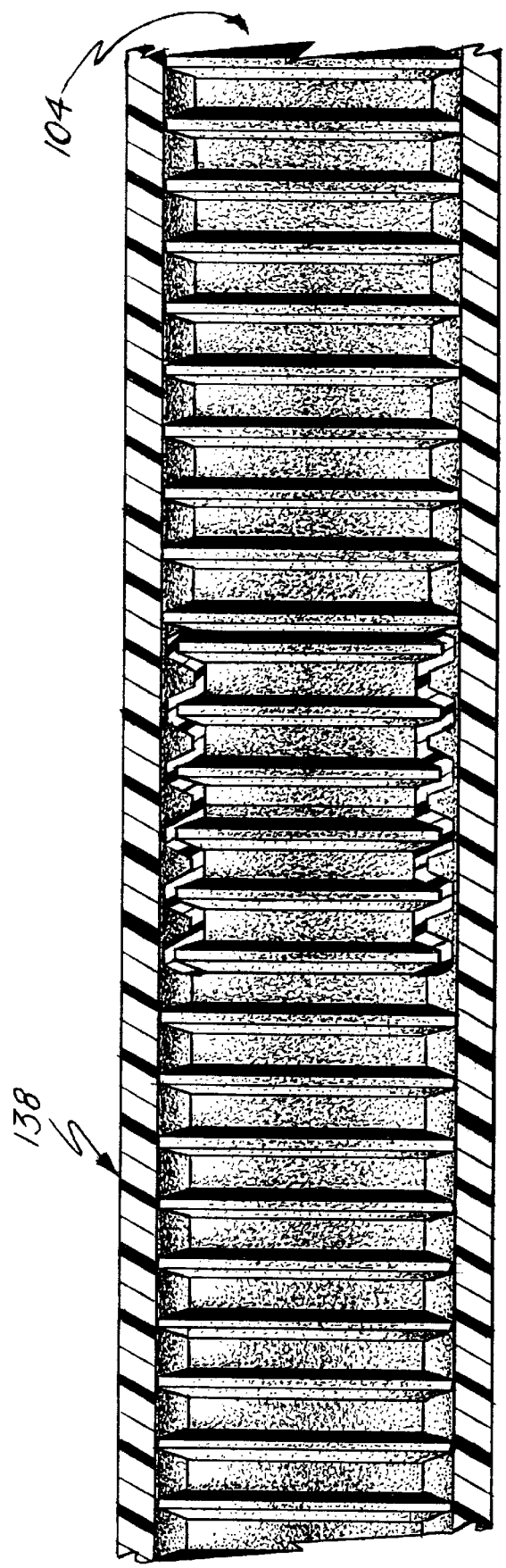
FIG. 5 is an elevation view of another preferred embodiment of the automobile body protection apparatus of the present invention showing a protective sheath.

Referring to FIG. 5, the flexible convoluted tubing 104 is provided with an outer sheath 138. The outer sheath 138 is positioned around the outer circumference of the tubing 104 and is formed of a soft material, such as cotton, silk, nylon, or other such material, that provides a layer of cushioning for the purpose of eliminating or reducing the possibility of scratches or other abrasion that may be caused by vibration or contact between the tubing 104 and the external surface 110 of the automobile 102 (FIG. 1).

Figure 6:
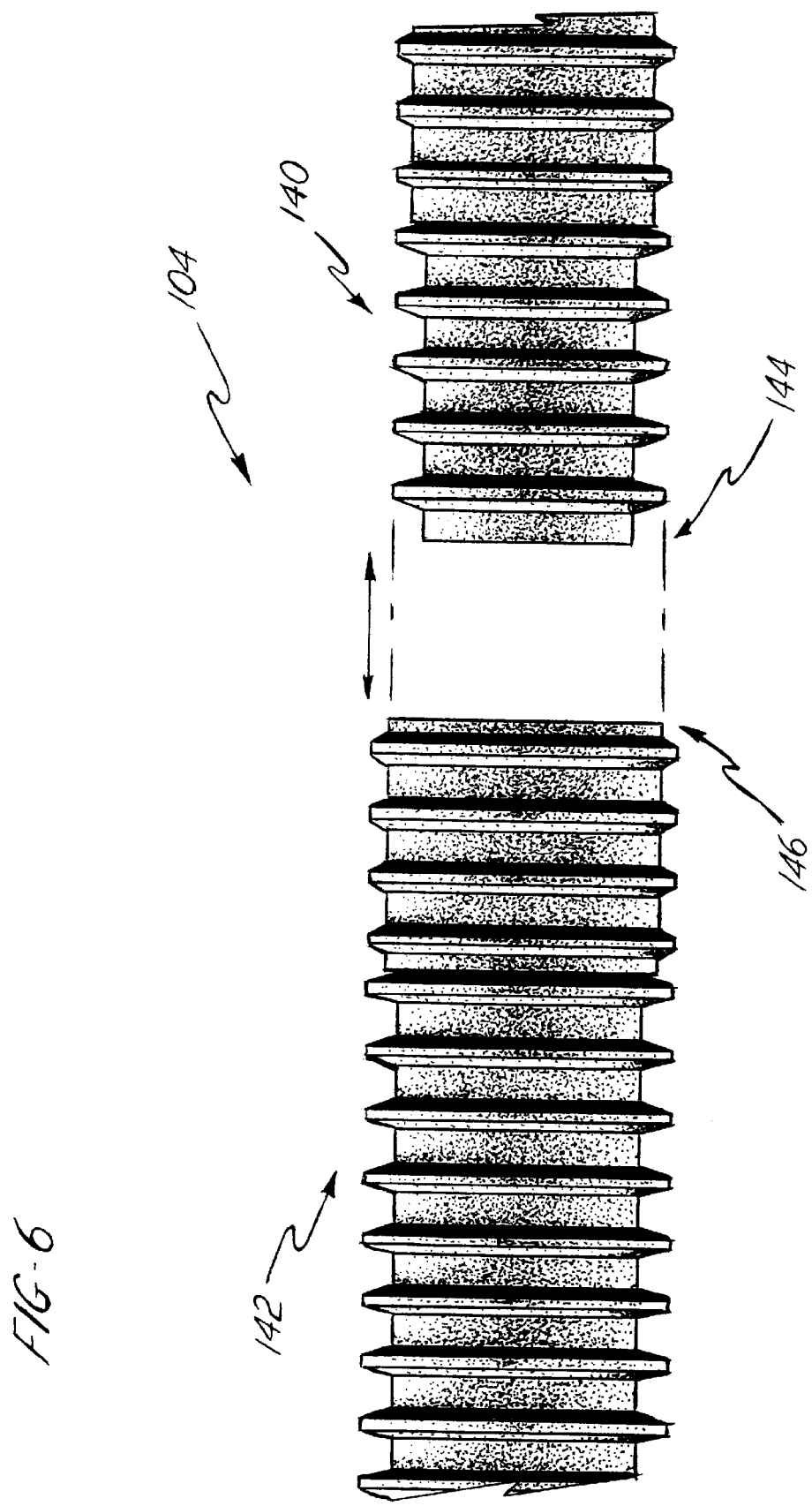
FIG. 6 is an elevation view of another preferred embodiment of the automobile body protection apparatus of the present invention showing the first end of a first tubing section and the second end of a second tubing section.
Figure 7:
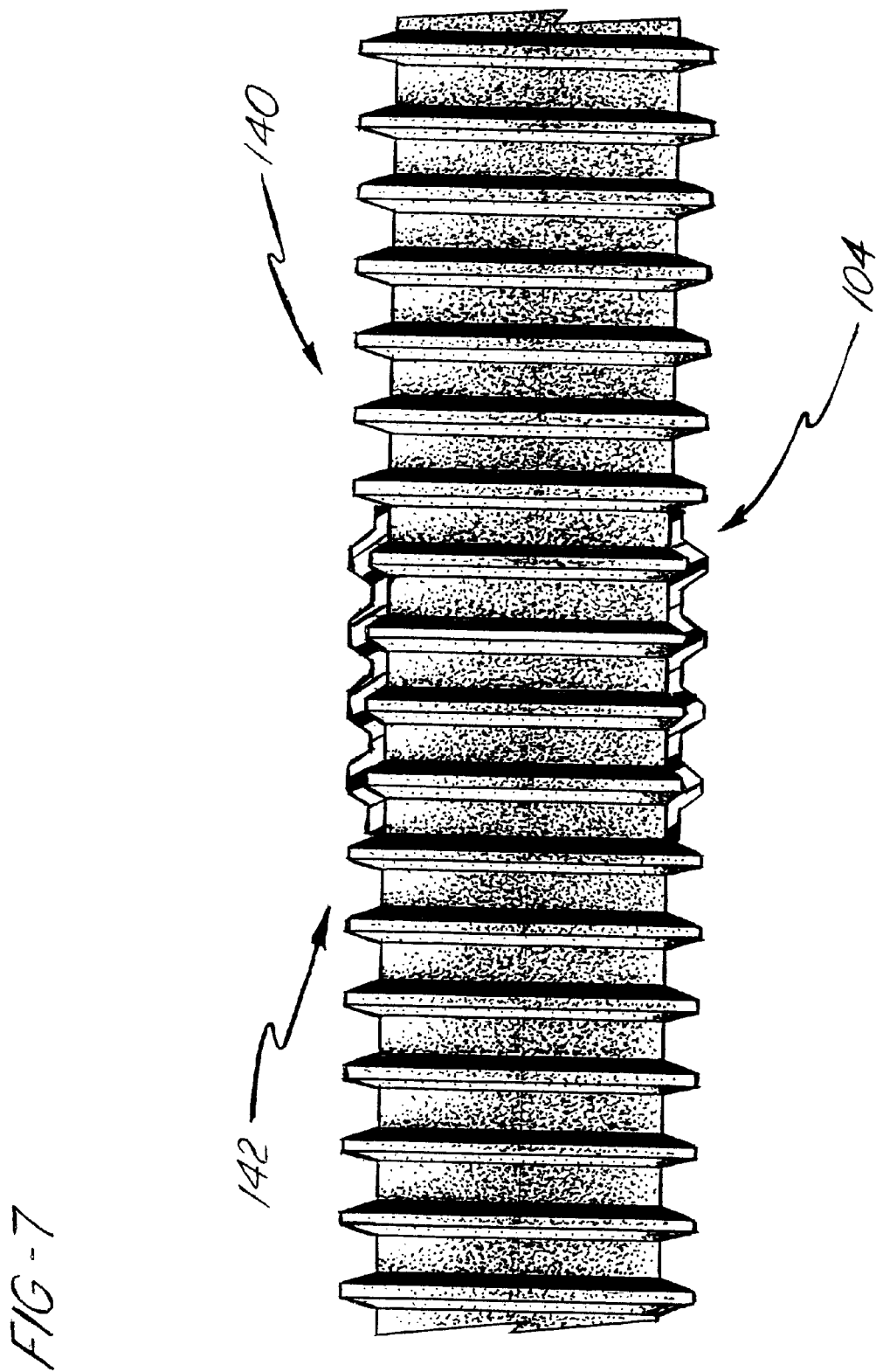
FIG. 7 is an elevation view of another preferred embodiment of the automobile body protection apparatus of the present invention showing of FIG. 6 showing the first tubing section interlocked in position with the second tubing section.

Referring to FIGS. 6 and 7, another preferred embodiment of the automobile body protection apparatus is shown comprising a convoluted tubing 104 formed from a first tubing section 140 and a second tubing section 142, identical or dissimilar in length, each having a first and a second end, 144 and 146, respectively (The first end of the second tubing section 142 and the second end of the first tubing section 140 are not shown). As shown in FIG. 6, the outer diameter of the first end 144 of the first tubing section 140 is approximately the same as the inner diameter of the second end 146 of the second tubing section 142. Depending on the particular automobile, as shown in FIG. 7, the ends of the tubing sections 140 and 142 may be interlocked together to form the continuous convoluted tubing 104 by sliding the smaller diameter first end 144 into the second end 146 such that the surfaces 148 of the convolutions 114 of the smaller diameter first end 144 of tubing section 140 (FIG. 6) slide along the inner surface of the larger diameter second end 146 of the other tubular section 142 (FIG. 6). Because of the flexible resilient nature of the tubing sections 140 and 142, the user may be easily disengaged the ends when not needed or for storage. It should now be apparent to those skilled in the art that multiple tubing sections may be connected together to provide an automobile body protection apparatus of varying lengths.

Referring to FIGS. 8 and 9, another embodiment of the automobile body protection apparatus 100 is shown having an anti-theft device 150 for preventing the theft or unauthorized taking of the apparatus 100. As shown, the anti-theft device comprises a cable 152, preferably a tempered steel cable having a plastic coating, such as a conventional bicycle lock cable, that is relatively difficult to cut having a first end 154 secured to the convoluted tubing 104 and a second end 156 for securing the cable 152 between the door 158 and the door post 160 of the automobile 102. It should be understood by those skilled in the art that the cable 152 should be of sufficient length to permit the anti-theft device 150 to be used with a variety of sized automobiles. Preferably, the first end 154 of the cable 152 is inserted trough an aperture in the convoluted tubing 104 and includes conventional means, such as a plate, knob, clip, or other like means for preventing the first end 154 from slipping back through the aperture and detaching from the convoluted tubing 104. The second end 156 of the cable 152 is provided with a ball, plate or other such means 162 sized for being inserted between and securing the cable 152 between the door 158 and the door post 160 of the automobile 102. It should now be apparent to those skilled in the art that the operator can simply open the door 158, insert the means 162 between the door 158 and the door post 160, and shut the door 158. Once the second end 156 of the cable 152 is secured in place between the door 158 and the door post 160 of the automobile 102, the apparatus 100 can be simply locked to the automobile 102 by locking the door 158 thereby preventing theft of the automobile body protection apparatus 100.

Referring to FIG. 10, another preferred embodiment of the anti-theft device 150 is shown whereby the second end 156 of the cable 152 includes a hook, loop, or other like means 164 for attaching to a door catch (not shown) of the automobile 102. It should now be apparent to those skilled in the art that the anti-theft device 150 can be attached to the automobile 102 (FIG. 9) by simply opening the door 158 (FIG. 9), attaching the hook or other like means 164 to the door catch, and shutting the door 158. The automobile body protection apparatus 100 can then be simply locked to the automobile 102 by locking the door 158.

The present invention, as described herein, is a novel automobile body protection apparatus having a durable and lightweight construction, which is relatively inexpensive to manufacture, and provides a resilient buffer capable of receiving an impact, such as from doors from adjacent vehicles, shopping carts and the like. As described, the use of convoluted tubing, provides the apparatus with sufficient resiliency and flexibility for adapting its use for a variety of automobile body styles and configurations as well as the capability of being rolled or coiled for periods of storage. In addition, the use of convoluted tubing provides drainage that prevents rain water from accumulating on the top and between the exterior surface of the automobile and the tubing which can cause sagging or displacement of the apparatus thereby reducing its effectiveness. The use of the sheath is optional but may be desirable in many situations. In order to prevent theft, the automobile body protection apparatus may include an anti-theft device for locking the apparatus to the automobile.

Although this invention has been shown and described with respect to detailed embodiments thereof, it will be understood by those skilled in the art that various changes in form and detail thereof may be made without departing from the spirit and scope of the claimed invention.

What is claimed is:

1. An automobile body protection apparatus for attaching to the external surface of an automobile, the apparatus comprising:

flexible convoluted tubing; and means for attaching and positioning said tubing along the external surface of the automobile.

2. The automobile body protection apparatus of claim 1 wherein said flexible convoluted tubing is formed of an elastomeric material.

3. The automobile body protection apparatus of claim 1 wherein said convoluted tubing is formed from at least two tubing sections.

4. The automobile body protection apparatus of claim 1 wherein said means for attaching and positioning said convoluted tubing along the external surface of the automobile comprises an elastic strap having means for attaching to the wheel well of the automobile.

5. The automobile body protection apparatus of claim 1 wherein said means for attaching and positioning said convoluted tubing along the external surface of the automobile comprises a plurality of suction means.

6. The automobile body protection apparatus of claim 5 wherein said suction means is adjustable to laterally adjust the position of said convoluted tubing to or away from the external surface of the automobile.

7. The automobile protection apparatus of claim 1 further comprising an outer sheath positioned around the outer circumference of said tubing.

8. The automobile protection apparatus of claim 1 further comprising an anti-theft device for locking the automobile protection apparatus to the automobile.

9. An automobile body protection apparatus for attaching to the external surface of an automobile, the apparatus comprising:

flexible tubing; and a plurality of suction devices for removably attaching said flexible tubing to the external surface of the automobile;

wherein said tubing having a plurality of axially spaced annular circumferential convolutions for providing drainage to prevent water from accumulating along the top surface of said flexible tubing and between the apparatus and the surface of the automobile.

10. The automobile body protection apparatus of claim 9 wherein said flexible convoluted tubing is formed of an elastomeric material.

11. The automobile body protection apparatus of claim 9 wherein said convoluted tubing is formed from at least two tubing sections.

12. The automobile protection apparatus of claim 9 further comprising an outer sheath positioned around the outer circumference of said tubing.

13. The automobile body protection apparatus of claim 11 wherein said tubing sections are removable attached to each other.

14. The automobile body protection apparatus of claim 9 wherein said suction devices are adjustable to laterally adjust the position of said convoluted tubing to or away from the external surface of the automobile.

15. The automobile body protection apparatus of claim 9 wherein said flexible tubing having an external diameter of about 0.75 inches (1.91 cm) to about 4.0 inches (10.16 cm).

16. An automobile body protection apparatus for attaching to the external surface of an automobile having front and rear wheel wells, the apparatus comprising:

flexible convoluted tubing having an external diameter of about 0.75 inches (1.91 cm) to about 4.0 inches (10.16 cm);

means for removably attaching and positioning said tubing along the external surface of the automobile; and an outer sheath positioned around the outer circumference of said tubing.

17. The automobile body protection apparatus of claim 16 wherein said means for removably attaching and positioning said tubing along the external surface of the automobile includes means for attaching said tubing to the front and rear wheel wells of the automobile.

18. The automobile body protection apparatus of claim 17 wherein said means for attaching said tubing to the wheel wells of the automobile includes means for maintaining said tubing in a relatively taut condition.

19. The automobile body protection apparatus of claim 16 wherein said means for removably attaching and positioning said tubing along the external surface of the automobile comprises a plurality of suction devices.

20. The automobile body protection apparatus of claim 16 further comprising an anti-theft means for locking the automobile body protection apparatus to the automobile.

* * * * *